March 4, 1924.

M. SPiNELLO

MOTOR CONTROL FOR KEY CUTTING MACHINES AND THE LIKE

Filed May 25, 1922

1,485,892

Inventor
Mathew Spinello
By Ira J. Wilson
Atty.

Patented Mar. 4, 1924.

1,485,892

UNITED STATES PATENT OFFICE.

MATHEW SPINELLO, OF ROCKFORD, ILLINOIS, ASSIGNOR OF ONE-HALF TO ARCHIE J. SHIMP, OF ROCKFORD, ILLINOIS.

MOTOR CONTROL FOR KEY-CUTTING MACHINES AND THE LIKE.

Application filed May 25, 1922. Serial No. 563,683.

*To all whom it may concern:*

Be it known that I, MATHEW SPINELLO, a citizen of the United States, residing at Rockford, in the county of Winnebago and State of Illinois, have invented certain new and useful Improvements in Motor Controls for Key-Cutting Machines and the like, of which the following is a specification.

This invention has reference to a motor control for machines employing a motor-driven cutter or tool, and a work-carrier adapted to be manipulated to bring the work into and out of cutting relation to the cutter.

More particularly, my invention relates to a motor control for key-cutting machines, and the primary object is to provide means automatically operated by the work-carrier in moving the work to and from the cutter for closing and opening the motor circuit. This effects both a saving of time in the manual operation of the machine and also a saving of electric current.

Another object is to provide an attachment which may be economically produced and readily applied to machines of the character described, which will serve in a practical and satisfactory manner the purposes intended.

Referring to the drawing,—

Figure 1:
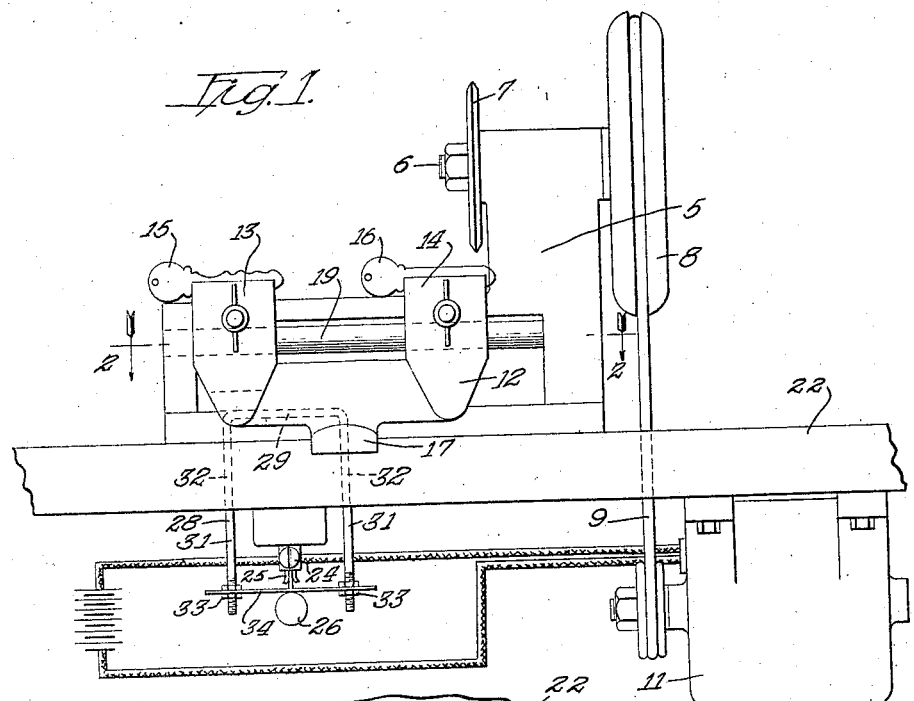
Figure 1 is a front elevation of a motor-driven key-cutting machine embodying my invention.

The key-cutting machine shown in the drawing, merely for purpose of illustration, comprises a suitable standard 5 on which is journaled a horizontal cutter spindle 6 equipped with a milling cutter 7 and a pulley 8 driven by means of a belt 9 and an electric motor 11. The machine also includes a work-carrier designated generally by 12, having laterally spaced pairs of jaws 13 and 14 for respectively carrying a key 15 and a key blank 16, the latter of which is to be milled by the cutter 7 to produce a duplicate of the key 15. The key-carrying jaws 13 and 14 are carried in spaced relation at the outer end of the work carrier 12, which in the present instance is in the form of a frame having a handle portion 17 joining the fixed jaw portions and having spaced arms 18 slidably and rotatably mounted on a rod 19 supported by the standards or brackets 5 and 21. As shown plainly in Fig. 2, the work-carrier frame is adapted to be slid back and forth on the rod 19 for moving the key blank 16 along the cutter 7. The handle end 17 of the work-carrier frame may be raised and lowered, thereby tilting said frame on the rod 19 as a fulcrum for bringing the key blank into and out of cutting relation with the cutter 7 and for feeding the blank with respect to the cutter. The cutting operation will be controlled by the pattern key 15 which bears against a fixed abutment, not shown, limiting approach of the key blank to the cutter and defining the contour of the cut as is well known in key-cutting machines of this class. In other words, to cut a duplicate key, the operator grasps the handle 17 of the work-carrier frame which is shown in the idle inoperative position in Fig. 1, raises the frame to bring the key blank 16 into cutting relation with the cutter 7, and then feeds the work-carrier frame to the right while bearing forwardly on the handle 17 for the purpose of holding the edge of the key 15 against the fixed abutment or guide to thereby duplicate the pattern of the key 15.

My present invention contemplates the provision of means for automatically closing and opening the motor circuit by operation of the work carrier 12 to the end that the motor will be started by the act of raising the work carrier to bring the key blank into cutting relation with the cutter and will be automatically stopped after completion of the cutting operation by the act of lowering the work carrier to the idle position. For this purpose, I mount on the underside of the base board 22, a single-pole knife switch, the terminals 23 and 24 of which are adapted to be connected by the knife 25, which in its present form has a handle 26. To these terminals are connected the leads of the motor circuit which is shown diagrammatically in Fig. 1, it being obvious that the circuit may be closed and opened for starting and stopping the motor by closing and opening the knife switch. A suitable spring 27 serves to constantly urge the blade 25 to the closed position.

Figure 2:
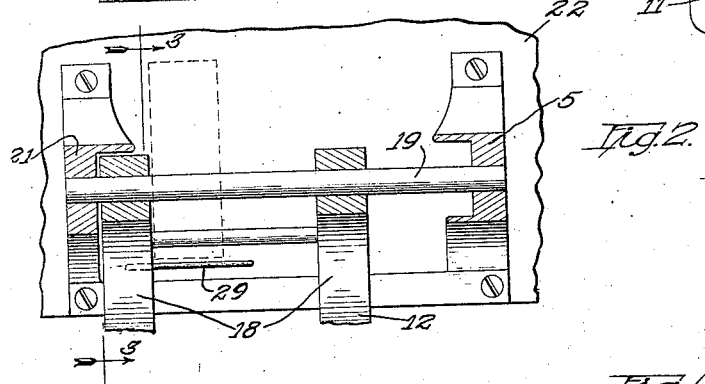
Fig. 2 is a horizontal fragmentary sectional view taken on the line 2—2 of Fig. 1.
Figure 3:
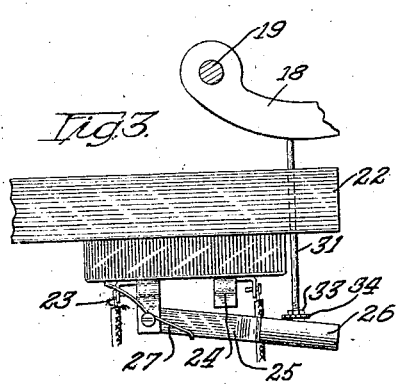
Fig. 3 is a side elevation of the motor-control switch and showing in part, the work-carrier for actuating the switch this view being taken on the line 3—3 of Fig. 2.
Figure 4:
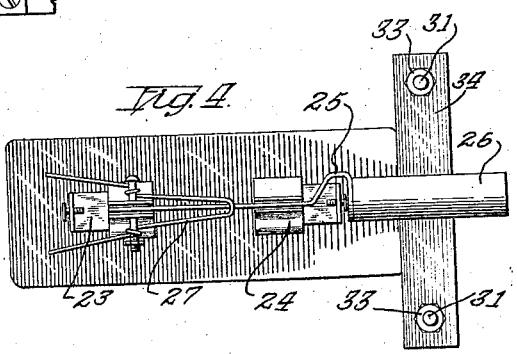
Fig. 4 is a bottom view of the switch and the switch actuating part.

Means is provided for actuating the switch blade 25 by movement of the work-carrier 12. This means in the present instance, consists of a wire member 28 bent upon itself to provide a cross head 29 and parallel arms 31 which pass through vertical holes 32 in the base board 22. The lower ends of these arms 31 are threaded to receive nuts 33 between which are clamped a cross piece 34. This cross piece 34 rests on the outer end or handle of the switch blade 25, as plainly shown. The part 28 is so disposed that one of the arms 18 of the work-carrier will be adapted to rest on the cross head 29 at any position of the work-carrier within its range of horizontal movement. The outer end of the work-carrier rests, therefore, on the cross head 29 as shown in Figs. 1 and 3, and inasmuch as the weight of this work-carrier is sufficient to overcome the pressure of the spring 27, the switch will be held open when the work-carrier is released and gravitates to the idle position shown. It will be manifest that upon raising the work-carrier as described above, it will be raised from the cross-head 29, permitting the knife switch to close under influence of the spring 27. It will be manifest that at any horizonally shifted position of the work-carrier, it will be in operative relation to the cross head 19 and thereby in position to close or open the switch, as the case may be.

As a result of the foregoing, the motor is automatically controlled and put into operation only when actually required. This relieves the operator's attention from the matter of closing and opening the motor circuit and it also insures a saving of electric current. Furthermore, the operation is positive; and my improvements may be applied with very little extra cost to machines of this class.

It is believed that the foregoing conveys a clear understanding of the present invention, and while I have described but a single working embodiment, it should be understood that changes might be made in details of construction without departing from the spirit and scope of the invention as expressed in the appended claim.

I claim:

In a key cutting machine, the combination of a motor driven cutter, a carriage for carrying a key and a key blank mounted to swing vertically about a horizontal axis for moving the key blank toward and from the cutter and to slide longitudinally of said axis to feed said blank horizontally past the cutter, and a motor controlling switch actuated by said carriage for starting and stopping the motor.

MATHEW SPINELLO.